May 19, 1959 S. J. LIEVENSE 2,886,914
FISHING DEVICE
Filed April 30, 1956

INVENTOR.
Stanley J. Lievense
BY Otma Earl
Attorney.

United States Patent Office 2,886,914
Patented May 19, 1959

2,886,914

FISHING DEVICE

Stanley J. Lievense, Traverse City, Mich.

Application April 30, 1956, Serial No. 581,516

7 Claims. (Cl. 43—42.39)

This invention relates to a fishing device or lure designed to be used in connection with a bait either live or artificial.

The main objects of this invention are:

First, to provide a fishing device or lure to which a bait may be attached, the device being adapted to attract the fish as it is propelled or drawn through the water and having a zigzag or swimming movement and imparting a substantial movement to the bait which may be attached thereto.

Second, to provide a fishing device or lure having these advantages in which the motion and the depth below the surface may be substantially controlled by the speed at which the device is drawn through the water.

Third, to provide a fishing device having these advantages which may be economically formed of translucent light reflecting plastic material.

Objects relating to details and economies of the invention will appear from the description to follow. The invention is defined and pointed out in the claims.

A preferred embodiment of the invention is illustrated in the accompanying drawing, in which.

Figure 3:
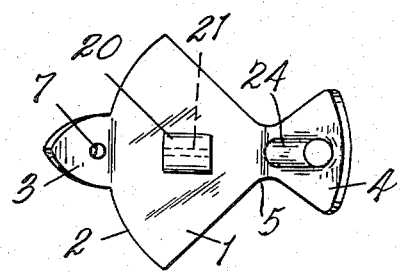
Fig. 3 is an inverted view.
Figure 2:
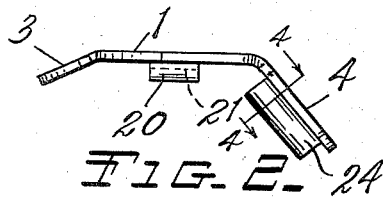
Fig. 2 is a side elevational view of the body member of the device.
Figure 4:
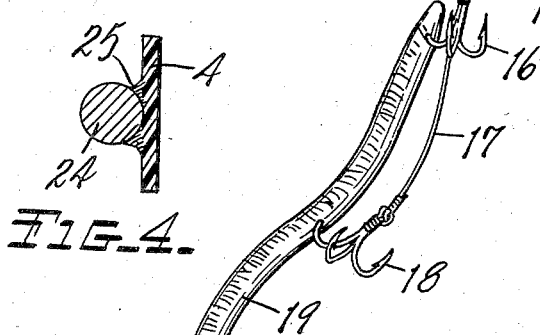
Fig. 4 is an enlarged fragmentary view in section on a line corresponding to line 4—4 of Fig. 2.
Figure 1:
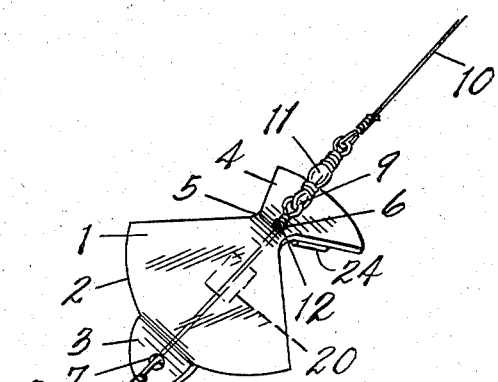
Fig. 1 is a perspective view of a fishing device embodying my invention with a worm-like bait attached thereto, the line being broken away.

The embodiment of my invention shown in Figs. 1, 2 and 3 comprise a flat forwardly tapered body member 1 having a rearwardly curved rear edge 2 merging into the central downwardly and rearwardly projecting and rearwardly tapered tailpiece 3. The rearwardly tapered headpiece 4 projects downwardly and forwardly from the apex of the body member and is joined thereto by the relatively narrow neck portion 5. The body member, tailpiece and headpiece in the preferred embodiment may be and are desirably formed of translucent light reflecting sheet plastic.

The headpiece 4 has a hole 6 therethrough and the tailpiece 3 has a hole 7 therethrough, these holes are positioned to receive the rod 8 which is commonly formed of wire and provided with an eye 9 at its front end to which the line 10 is connected by means of the coupling link 11. The wire is bent to form the eye and twisted at 12 to close the eye and form a stop limiting the relative movement of the rod and the body member.

The rod projects substantially rearwardly of the tailpiece and in the preferred embodiment is provided with a fixed hook 13 which is located quite close to the body member. At its rear end the rod is provided with an eye 14 with which the coupling clip 15 is engaged. The coupling clip is adapted to attack a hook, a multiple pronged hook 16 being illustrated. A leader 17 extends from the hook 16 and has a multiple hook 18 secured to its rear end. The bait 19 may be a live bait or an artificial bait. Various forms of artificial baits are available.

In the preferred embodiment the rod 8 is further secured to the body by means of the attaching block 20 which is secured centrally on the underside of the body and has a groove 21 therein in which the rod is disposed. This supports the rod closely against the underside of the body. The block 20 also is desirably formed of translucent plastic material.

In the embodiment illustrated in Figs. 1 to 4, inclusive, a weight 24 is attached to the underside of the head piece centrally and extending longitudinally thereof. In the embodiment illustrated a section of metal weight is bonded to the headpiece, desirably of thermoplastic material, as indicated at 25. This weight insures that the device will travel under water and increases the swinging movement. The clip 15 is shown open in Fig. 5.

Figure 6:
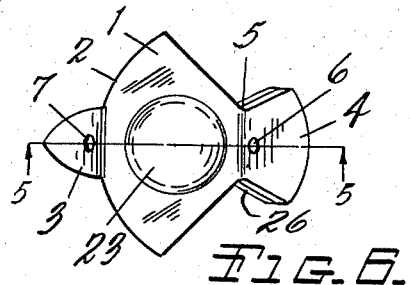
Fig. 6 is a fragmentary top plan view of the embodiment shown in Fig. 5.
Figure 5:
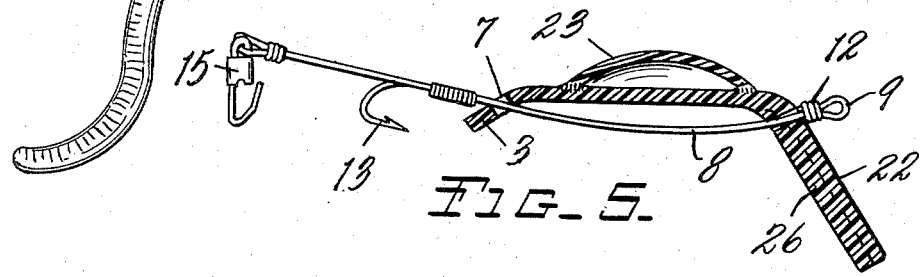
Fig. 5 is a view partially in central section from front to rear of a modified form or embodiment of my invention.

In the embodiments shown in Figs. 5 and 6, a second portion 26 is added in lieu of the weight 24 in the embodiments of Figs. 1 to 4. In this embodiment, a spherically curved member 23 is secured to the top of the body member of the bait. This is centrally located as is shown in Figs. 5 and 6. It provides an air chamber and adds to underwater stability of the device. It also provides a light reflecting surface which adds to the attractiveness of the device.

It is desired to point out that while current and other conditions influence the movement of the lure in the water, the action generally stated has an edgewise swinging movement as the device is drawn through the water with the result that the bait as 19 is given a substantial swinging and swimming simulating movement attractive to fish.

The translucent light reflecting body, headpiece and tailpiece present different reflected angles owing to their angular relation to each other and owing to the movement of the device as it is drawn through the water which adds to its effectiveness.

In use a bait is desirably attached to the hook 13 and this may be of various kinds, for example, a pork rind or imitation pork rind may be used. This placement of the hook 13 is desirable as sometimes the strike is directed at the body portion instead of at the bait attached to the rearwardly extending portion of the rod 8. It will be noted that a load as of a fish on the hook is transmitted to the line through the rod.

The extension of the rod 8 a substantial distance to the rear of the body member adds to the motion of the bait attached thereto.

I have illustrated and described my invention in highly practical embodiments thereof. I have not attempted to illustrate or describe other modifications or embodiments as it is believed this disclosure will enable those skilled in the art to embody or adapt my invention as may be desired.

Having thus described my invention what I claim as new and desire to secure by Letters Patent is:

1. A fishing device comprising a flat forwardly tapered body member having a rearwardly curved rear edge merging into a central rearwardly tapered and rearwardly and downwardly projecting tail piece, a rearwardly tapered forwardly and downwardly projecting head piece merging into the apex of the body member, said head piece having a forwardly curved front edge, and having a weight disposed centrally on its underside, said head and tail pieces having holes therein adjacent the plane of the underside of the body member, a rod disposed through said openings in said head and tail pieces and projecting a substantial distance rearwardly of said tail piece, said rod being provided with a line attaching eye at its front end and a stop coacting with said head piece, a rod supporting block through which said rod is disposed centrally of and fixedly secured to the underside of said body member, a hook fixedly secured to said rod at the rear of and adjacent to said tail piece, and a hook coupling link swingably connected to the rear end of said rod.

2. A fishing device comprising a flat forwardly tapered body member having a rearwardly curved rear edge merging into a central rearwardly tapered and rearwardly and downwardly projecting tail piece, a rearwardly tapered forwardly and downwardly projecting head piece merging into the apex of the body member, said head piece having a forwardly curved front edge, said head and tail pieces having holes therein adjacent the plane of the underside of the body member, a rod disposed through said openings in said head and tail pieces and projecting a substantial distance rearwardly of said tail piece, said rod being provided with a line attaching eye at its front end and a stop coacting with said head piece, a rod supporting block through which said rod is disposed centrally of and fixedly secured to the underside of said body member, a hook fixedly secured to said rod at the rear of and adjacent to said tail piece, and a hook coupling link swingably connected to the rear end of said rod.

3. A fishing device comprising a flat forwardly tapered body member having a rearwardly curved rear edge merging into a central rearwardly tapered and rearwardly and downwardly projecting tail piece, a rearwardly tapered forwardly and downwardly projecting head piece merging into the apex of the body member, said head piece having a weight on its underside disposed centrally thereof, said body member, tail and head pieces being formed integrally of translucent light reflecting sheet plastic, said head and tail pieces having holes therein adjacent the plane of the underside of the body member, and a line and hook attaching rod disposed through said openings in said head and tail pieces.

4. A fishing lure comprising a flat forwardly tapered body member having a rearwardly curved rear edge merging into a relatively narrow rearwardly tapered tail piece disposed centrally thereof and projecting downwardly and rearwardly relative to the plane of the body member, and a rearwardly tapered head piece projecting forwardly and downwardly relative to the plane of the body member and merging into the front end thereof, the merging zone of said head and body members being relatively narrow as compared to the greatest lateral width of both, said head and tail pieces having holes therein adjacent the plane of the underside of the body member, and a line and hook attaching rod disposed through the opening in said head and tail piece members with the head piece projecting downwardly and forwardly relative to the rod.

5. A fishing lure comprising a flat forwardly tapered body member having a relatively narrow tail piece disposed centrally thereof and projecting downwardly relative to the plane of the body member, and a head piece of less width at its widest zone than the width of the body member at its widest zone projecting forwardly and downwardly relative to the plane of the body member and having rearwardly converging edges merging into the front end of the body member in a neck portion which is relatively narrow as compared to the widest lateral width of both the body and head members, and a rod disposed through said head and tail pieces and centrally relative to said body member and projecting a substantial distance rearwardly of said body member, said rod being provided with a line attaching eye at its front end at the front of said head member, a hook fixedly secured to said rod at the rear of and adjacent to said tail piece, and a hook swingably connected to the rear end of the rod.

6. A fishing lure comprising a flat forwardly tapered body member having a relatively narrow tail piece disposed centrally thereof and projecting downwardly relative to the plane of the body member, and a head piece of less width at its widest zone than the width of the body member at its widest zone projecting forwardly and downwardly relative to the plane of the body member and having rearwardly converging edges merging into the front end of the body member in a neck portion which is relatively narrow as compared to the widest lateral width of both the body and head members, and a rod disposed through said head and tail pieces and centrally relative to said body member and projecting a substantial distance rearwardly of said body member, said rod being provided with a line attaching eye at its front end at the front of said head member, and a hook swingably connected to the rear end of the rod.

7. A fishing lure comprising a flat forwardly tapered body member having a relatively narrow tail piece disposed centrally thereof and projecting downwardly relative to the plane of the body member, and a head piece of less width at its widest zone than the width of the body member at its widest zone projecting forwardly and downwardly relative to the plane of the body member and having rearwardly converging edges merging into the front end of the body member in a neck portion which is relatively narrow as compared to the widest lateral width of both the body and head members, and a rod disposed through said head and tail pieces disposed centrally relative to said body member, said rod being provided with a line attaching eye at its front end at the front of said head member, and a hook connected to said rod.

References Cited in the file of this patent

UNITED STATES PATENTS

| | | |
|---|---|---|
| 1,889,707 | Soltis | Nov. 29, 1932 |
| 1,893,390 | Benzick | Jan. 3, 1933 |
| 2,088,775 | Davenport | Aug. 3, 1937 |
| 2,149,464 | Potts | Mar. 7, 1939 |
| 2,179,641 | Layfield | Nov. 14, 1939 |
| 2,481,445 | Premo | Sept. 6, 1949 |
| 2,511,117 | Loeb | June 13, 1950 |
| 2,516,399 | Lovelace | July 25, 1950 |
| 2,522,179 | Jensen | Sept. 12, 1950 |
| 2,698,494 | Larsen | Jan. 4, 1955 |
| 2,747,319 | Rondello | May 29, 1956 |
| 2,774,171 | Pulver | Dec. 18, 1956 |